(12) United States Patent
Na et al.

(10) Patent No.: US 10,744,893 B2
(45) Date of Patent: Aug. 18, 2020

(54) LOCKING MECHANISM FOR VEHICLE

(71) Applicants: Hyundai Motor Company, Seoul (KR); Kia Motors Corporation, Seoul (KR)

(72) Inventors: Jung Hwan Na, Gyeonggi-do (KR); Myoung Seok Lee, Gyeonggi-do (KR); Jee Hye Jeong, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 157 days.

(21) Appl. No.: 16/011,907

(22) Filed: Jun. 19, 2018

(65) Prior Publication Data
US 2019/0176634 A1 Jun. 13, 2019

(30) Foreign Application Priority Data
Dec. 13, 2017 (KR) .......................... 10-2017-0171157

(51) Int. Cl.
*F16H 1/20* (2006.01)
*F16H 19/04* (2006.01)
(Continued)

(52) U.S. Cl.
CPC ................ *B60L 53/16* (2019.02); *F16H 1/20* (2013.01); *F16H 19/04* (2013.01); *H01R 13/629* (2013.01); *H01R 13/6397* (2013.01)

(58) Field of Classification Search
CPC ... B60L 11/1818; H01R 13/629; H01H 19/04; Y10T 74/18528; Y10T 74/20534; Y10T 74/2172; B60T 13/686
(Continued)

(56) References Cited

U.S. PATENT DOCUMENTS 4,569,427 A * 2/1986 F'Geppert ............... F16D 11/14
                                                192/69.91
4,785,901 A * 11/1988 Maeda .................. B62D 5/0469
                                                180/446
(Continued)

FOREIGN PATENT DOCUMENTS

KR       20130060019 A       6/2013
KR         101605547 B1      3/2016
KR       20170073140 A       6/2017

OTHER PUBLICATIONS

Define pinion gear—Google Search, google.com., Jan. 23, 2020 (Year: 2020).*
(Continued)

*Primary Examiner* — Vinh Luong
(74) *Attorney, Agent, or Firm* — Mintz Levin Cohn Ferris Glovsky and Popeo, P.C.; Peter F. Corless

(57) ABSTRACT

A locking mechanism includes a drive motor; a locking member configured to perform a linear reciprocating motion along a predetermined movement path by the drive motor, and selectively locking or unlocking a predetermined object to be locked according to a position of the locking member on the movement path; a position sensor including a sensor gear rotatably driven by the drive motor and a variable resistor of which a resistance value is varied according to a rotation angle of the sensor gear; and a controller configured to determine an operating state of the locking member on the basis of a voltage value applied to the variable resistor.

17 Claims, 6 Drawing Sheets

(51) Int. Cl.
*H01R 13/629* (2006.01)
*B60L 53/16* (2019.01)
*H01R 13/639* (2006.01)

(58) Field of Classification Search
USPC .............................. 74/10.39, 842, 120, 422
See application file for complete search history.

(56) References Cited

U.S. PATENT DOCUMENTS

| | | | | |
|---|---|---|---|---|
| 5,051,775 | A * | 9/1991 | Yamakoshi | G03B 27/586 281/34 |
| 5,507,373 | A * | 4/1996 | Nguyen | F16D 29/005 192/3.58 |
| 6,705,421 | B2 * | 3/2004 | Palakodati | B62D 3/126 180/443 |
| 6,736,233 | B2 * | 5/2004 | Beishline | B60T 7/042 180/334 |
| 7,581,926 | B1 * | 9/2009 | Dehlsen | F03D 7/0236 416/87 |
| 2003/0151188 | A1 * | 8/2003 | Imahara | B65H 1/00 271/171 |
| 2005/0092118 | A1 * | 5/2005 | Wong | A47J 37/0842 74/422 |
| 2008/0190242 | A1 * | 8/2008 | Kim | G03G 21/1647 74/84 R |
| 2009/0255972 | A1 * | 10/2009 | Shima | B25C 5/1689 227/2 |
| 2013/0199364 | A1 * | 8/2013 | Weiberle | B60T 1/10 92/139 |
| 2014/0236087 | A1 * | 8/2014 | Alderete, Jr. | A61M 5/1452 604/152 |
| 2016/0252190 | A1 * | 9/2016 | Baasch | F01P 1/00 137/340 |

OTHER PUBLICATIONS

English Translation of Korean Application No. 20170073140, published Jun. 28, 2017.
English Translation of Korean Application No. 101605547 published Mar. 23, 2016.
English Translation of Korean Application No. 20130060019, published on Jun. 7, 2013.

* cited by examiner

LOCKING MECHANISM FOR VEHICLE

CROSS-REFERENCE TO RELATED APPLICATION

This application claims under 35 U.S.C. § 119(a) the benefit of Korean Patent Application No. 10-2017-0171157, filed on Dec. 13, 2017 in the Korean Intellectual Property Office, the entire contents of which are incorporated by reference herein.

BACKGROUND

(a) Technical Field

The present disclosure relates to a locking mechanism, more particularly, to a locking mechanism for a vehicle.

(b) Description of the Related Art

An electric vehicle (EV) may be powered by charging a battery with electricity from an external power source and supplying electricity from the battery to a motor.

EVs include a battery electric vehicle (BEV), a plug-in hybrid electric vehicle (PHEV), a hybrid electric vehicle (HEV), and the like. HEY combines an internal combustion engine with an electric motor, and can achieve better fuel economy and higher efficiency than a conventional vehicle with an internal combustion engine. PHEV is designed to use a battery of HEY recharged from an external power source, and BEV is only driven by a battery and an electric motor.

HEY, PHEV, and BEV are all powered by electricity. HEY generates electricity in the vehicle to charge the battery, and PHEV and BEV receive electricity from an external power source to charge the battery.

EVs such as PHEV and BEV may have a charging inlet for charging the battery, and the charging inlet may be provided on an outer panel of a vehicle body adjacent to a wheel of the vehicle.

A charger plug is detachably connected to the charging inlet, and the charger plug is connected to a system through a charging cable during charging. The charger plug connected to the charging inlet may be locked or unlocked by a locking mechanism.

A conventional locking mechanism may include a bar-like locking member provided with a rack gear, and the locking member may perform a linear reciprocating motion by a drive motor to selectively lock or unlock the charger plug connected to the charging inlet.

The conventional locking mechanism is not provided with a sensor or detector capable of detecting the occurrence of an abnormality in the operating state of the locking member due to penetration of foreign materials, erroneous mounting of the charger plug, or the like.

Therefore, in the conventional locking mechanism, electrical or mechanical damage may occur due to overload, or charging failure may occur when the charging of the battery proceeds with the charger plug erroneously connected.

SUMMARY

An aspect of the present disclosure provides a locking mechanism having an improved structure to detect that an abnormality has occurred in an operating state of a locking member.

Another aspect of the present disclosure provides a locking mechanism having an improved structure so as to be applicable to a variety of apparatuses having different specifications without structural modifications.

According to an aspect of the present disclosure, a locking mechanism may include: a drive motor; a locking member configured to perform a linear reciprocating motion along a predetermined movement path by the drive motor, and selectively locking or unlocking a predetermined object to be locked according to a position of the locking member on the movement path; a position sensor including a sensor gear rotatably driven by the drive motor and a variable resistor of which a resistance value is varied according to a rotation angle of the sensor gear; and a controller configured to determine an operating state of the locking member on the basis of a voltage value applied to the variable resistor.

The position sensor may further include a base resistor having a predetermined fixed resistance value.

The locking mechanism may further include a transfer gear configured to transmit a rotational force of the drive motor to each of the locking member and the sensor gear.

The locking member may include a rack gear meshing with the transfer gear.

The drive motor may include a shaft gear configured to output the rotational force, and the transfer gear may include a first reduction gear meshing with the shaft gear and the sensor gear to transmit the rotational force to the sensor gear.

The transfer gear may include a second reduction gear meshing with the first reduction gear, and a pinion gear coupled to the second reduction gear by a shaft and meshing with the rack gear to transmit the rotational force to the rack gear.

The variable resistor may be provided such that when the locking member is moved to a predetermined unlocking position, the voltage value is changed to a predetermined first voltage value, and when the locking member is moved to a predetermined locking position, the voltage value is changed to a predetermined second voltage value.

The controller may drive the drive motor to move the locking member to the locking position when a locking signal is input, and drive the drive motor to move the locking member to the unlocking position when an unlocking signal is input.

The controller may drive the drive motor to rotate in a forward direction so as to move the locking member to the locking position when the voltage value is the first voltage value at the time of input of the locking signal.

The controller may stop the drive motor when the voltage value is changed to the second voltage value, while driving the drive motor to rotate in the forward direction so as to move the locking member to the locking position.

The controller may determine that an abnormality has occurred in the operating state of the locking member when the voltage value is not changed to be close to the second voltage value, while driving the drive motor to rotate in the forward direction so as to move the locking member to the locking position.

The controller may drive the drive motor to rotate in a reverse direction so as to move the locking member to the unlocking position when the voltage value is not the first voltage value at the time of input of the locking signal, and change the voltage value to the first voltage value.

The controller may determine that an abnormality has occurred in the operating state of the locking member when the voltage value is not changed to be close to the first voltage value, while driving the drive motor to rotate in the reverse direction so as to move the locking member to the unlocking position.

The controller may drive the drive motor to rotate in a reverse direction so as to move the locking member to the unlocking position when the voltage value is the second voltage value at the time of input of the unlocking signal.

The controller may stop the drive motor when the voltage value is changed to the first voltage value, while driving the drive motor to rotate in the reverse direction so as to move the locking member to the unlocking position.

The controller may determine that an abnormality has occurred in the operating state of the locking member when the voltage value is not changed to be close to the first voltage value, while driving the drive motor to rotate in the reverse direction so as to move the locking member to the unlocking position.

The controller may drive the drive motor to rotate in a forward direction so as to move the locking member to the locking position when the voltage value is not the second voltage value at the time of input of the unlocking signal, and change the voltage value to the second voltage value.

The controller may determine that an abnormality has occurred in the operating state of the locking member when the voltage value is not changed to be close to the second voltage value, while driving the drive motor to rotate in the forward direction so as to move the locking member to the locking position.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
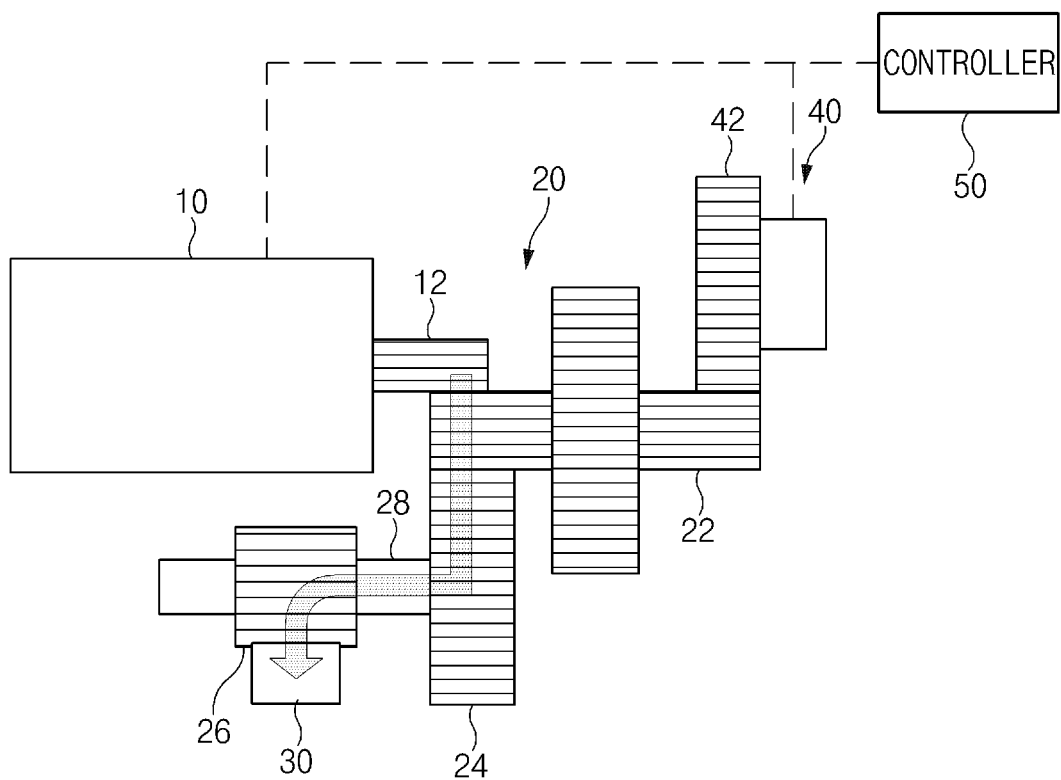
FIG. 1 is a schematic view of a locking mechanism according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

FIG. 1 is a schematic view of a locking mechanism according to an exemplary embodiment of the present disclosure.

Referring to FIG. 1, a locking mechanism 1 according to an exemplary embodiment of the present disclosure may include a drive motor 10, a transfer gear 20 configured to transmit the rotational force of the drive motor 10, a locking member 30 configured to perform a linear reciprocating motion by the rotational force of the drive motor 10 transmitted from the transfer gear 20 and locking or unlocking a predetermined object 60 to be locked, a position sensor 40 sensing the position of the locking member 30, and a controller 50 analyzing the operating state of the locking member 30 on the basis of the position of the locking member 30 sensed by the position sensor 40.

The locking mechanism 1 may be applied to an apparatus that is predetermined to lock the predetermined object 60. For example, the locking mechanism 1 may be applied to an electric vehicle such that it may lock a charger plug connected to a charging inlet of the electric vehicle.

The drive motor 10 may provide a rotational force for the linear reciprocating motion of the locking member 30. As illustrated in FIG. 1, the drive motor 10 may include a shaft gear 12 from which the rotational force is output. The drive motor 10 may rotate the shaft gear 12 in a predetermined forward or reverse direction to output the rotational force.

The transfer gear 20 may transmit the rotational force of the drive motor 10 to the locking member 30 and the position sensor 40. For example, as illustrated in FIG. 1, the transfer gear 20 may include a first reduction gear 22, a second reduction gear 24, and a pinion gear 26.

The first reduction gear 22 may mesh with the shaft gear 12 of the drive motor 10, and the number $N_2$ of teeth of the first reduction gear 22 may be greater than the number $N_1$ of teeth of the shaft gear 12. In addition, the first reduction gear 22 may mesh with a sensor gear 42 of the position sensor 40 and the second reduction gear 24. Thus, the first reduction gear 22 may reduce the rotational force of the drive motor 10 transmitted through the shaft gear 12 to transmit the reduced force to the sensor gear 42 and the second reduction gear 24 separately.

The second reduction gear 24 may mesh with the first reduction gear 22, and the number $N_3$ of teeth of the second reduction gear 24 may be greater than the number $N_2$ of teeth of the first reduction gear 22. The second reduction gear 24 may be coupled to the pinion gear 26 through a shaft 28. Thus, the second reduction gear 24 may reduce the rotational force of the drive motor 10 transmitted through the first reduction gear 22 to transmit the reduced force to the pinion gear 26.

The pinion gear 26 may be coupled to the second reduction gear 24 through the shaft 28. A diameter of the pinion gear 26 may be smaller than that of the second reduction gear 24, but is not limited thereto. The pinion gear 26 may mesh with a rack gear 32 of the locking member 30 to be described later. Thus, the pinion gear 26 may transmit the rotational force of the drive motor 10 transmitted through the second reduction gear 24 to the locking member 30 to enable the linear reciprocating motion of the locking member 30.

Figure 2:
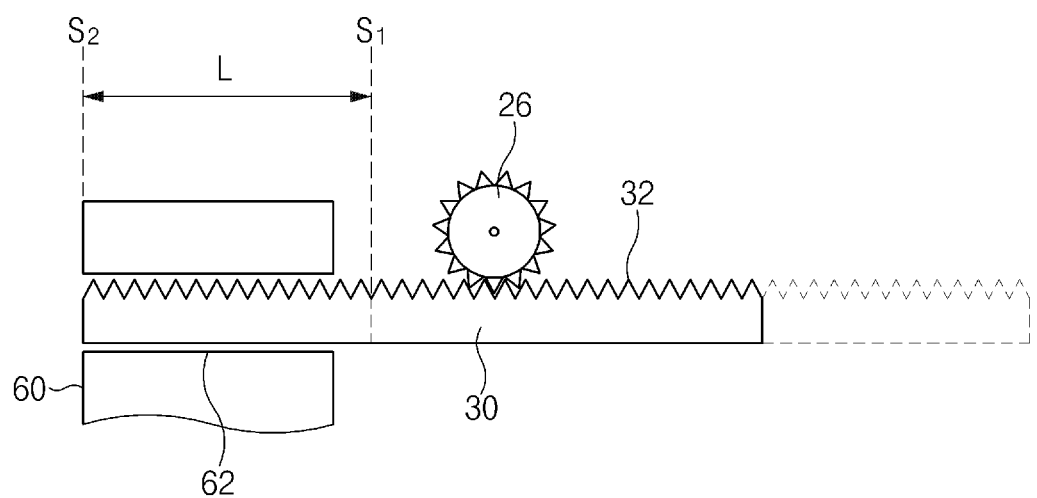
FIG. 2 is an isolated schematic view in which a locking member illustrated in FIG. 1 locks or unlocks an object to be locked.

FIG. 2 is an isolated schematic view in which the locking member of FIG. 1 locks or unlocks an object to be locked.

The locking member 30 may be designed to linearly reciprocate along a predetermined movement path by the pinion gear 26 to thereby selectively lock or unlock the predetermined object 60. To this end, as illustrated in FIG. 2, one surface of the locking member 30 may be provided with the rack gear 32 with which the pinion gear 26 mesh.

The movement path of the locking member 30 may be set to allow the locking member 30 to selectively lock or unlock the object 60 according to the position of the locking member 30 on the movement path. For example, as illustrated in FIG. 2, the movement path of the locking member 30 may be set to enable the linear reciprocating motion of the locking member 30 between an unlocking position $S_1$ in which the locking member 30 is separated from the object 60 to unlock the object 60 and a locking position $S_2$ in which a predetermined portion of the locking member 30 is engaged with a locking groove 62 of the object 60 such that the object 60 is locked by the locking member 30.

The unlocking position $S_1$ and the locking position $S_2$ are not particularly limited, and may be set differently according to the specifications of an apparatus to which the locking mechanism 1 is applied or the specifications of the object 60 to be locked.

The position of the locking member 30 on the movement path may be determined on the basis of a position of a predetermined portion of the locking member 30 on the movement path. For example, as illustrated in FIG. 2, the position of the locking member 30 on the movement path may be determined on the basis of a position of an end portion of the locking member 30 toward the object 60 on the movement path.

Figure 3:
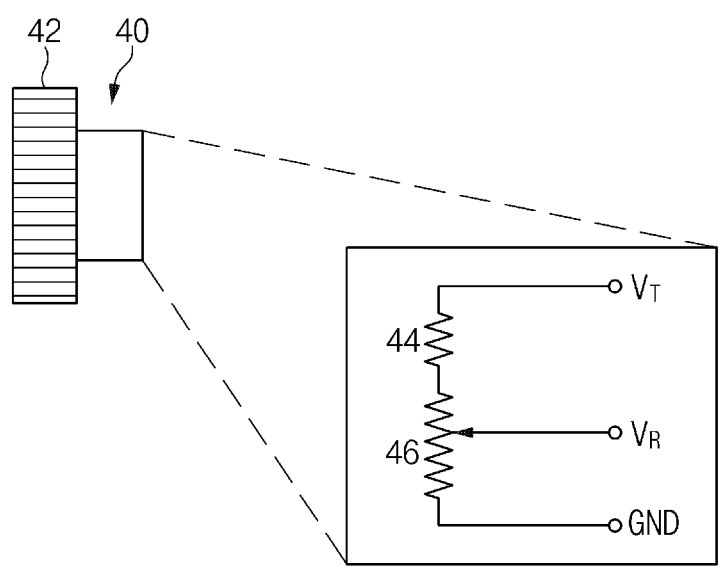
FIG. 3 is a conceptual diagram of a position sensor illustrated in FIG. 1.
Figure 4:
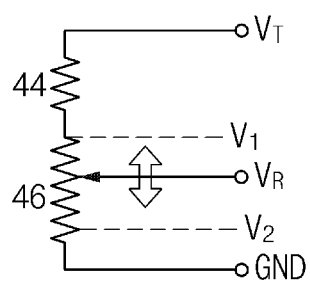
FIG. 4 is a diagram for explaining a method for analyzing the movement of the locking member using the position sensor illustrated in FIG. 3.

FIG. 3 is a conceptual diagram of the position sensor illustrated in FIG. 1, and FIG. 4 is a diagram for explaining a method for analyzing the movement of the locking member using the position sensor illustrated in FIG. 3.

The position sensor 40 may sense the position of the locking member 30. For example, as illustrated in FIGS. 1 and 3, the position sensor 40 may include the sensor gear 42 meshing with the transfer gear 20 to be rotatably driven by the rotational force of the drive motor 10, a base resistor 44 having a predetermined fixed resistance value $R_B$, and a variable resistor 46 of which a resistance value $R_V$ is varied according to a rotation angle of the sensor gear 42.

As illustrated in FIG. 1, the sensor gear 42 may mesh with the first reduction gear 22. The number $N_5$ of teeth of the sensor gear 42 may be greater than the number $N_2$ of teeth of the first reduction gear 22, but is not limited thereto. The sensor gear 42 may be restrictively rotatable within a predetermined reference rotation angle range N. The reference rotation angle range of the sensor gear 42 is not particularly limited. For example, the reference rotation angle range of the sensor gear 42 may be 300°.

Since the sensor gear 42 and the locking member 30 are driven by the rotational force of the drive motor 10, the rotation direction of the drive motor 10, the rotation direction of the sensor gear 42, and the movement direction of the locking member 30 may have a predetermined relationship. Hereinafter, the following exemplary embodiment of the present disclosure will be described: when the drive motor 10 is driven to rotate in a forward direction, the locking member 30 is moved to the locking position $S_2$ and the sensor gear 42 is driven to rotate in the forward direction, and when the drive motor 10 is driven to rotate in a reverse direction, the locking member 30 is moved to the unlocking position $S_1$ and the sensor gear 42 is driven to rotate in the reverse direction.

Since the sensor gear 42 is restrictively rotatable within the reference rotation angle range N, a stroke moving distance L of the locking member 30 may be proportional to the reference rotation angle range N of the sensor gear 42. The stroke moving distance L of the locking member 30 refers to a predetermined maximum stroke distance of the locking member 30, that is, a distance between the unlocking position $S_1$ and the locking position $S_2$. The stroke moving distance L of the locking member 30 may be expressed by the following equation:

$$L = 2\pi r_4 \times \frac{N_5}{N_3} \times \frac{N_2}{N_5} \times \frac{N}{360} \qquad \text{Equation 1}$$

L: stroke moving distance of locking member
$r_4$: pitch radius of pinion gear
$N_2$: number of teeth of first reduction gear
$N_3$: number of teeth of second reduction gear
$N_5$: number of teeth of sensor gear
N: reference rotation angle range of sensor gear According to Equation 1, the stroke moving distance L of the locking member 30 may be varied by adjusting the numbers of teeth of the gears, the reference rotation angle range N of the sensor gear 42, and the pitch radius $r_4$ of the pinion gear 26. The stroke moving distance L of the locking member 30 may be determined differently according to the specifications of the apparatus to which the locking mechanism 1 is applied or the specifications of the object 60 to be locked, but is not limited thereto.

The base resistor 44 may have a predetermined fixed resistance value $R_B$. On the other hand, the variable resistor 46 may have a resistance value $R_V$ that is varied in proportion to the rotation angle of the sensor gear 42. Thus, the variable resistor 46 may have a resistance value $R_V$ that is varied to correspond to a current position of the locking member 30 on the movement path. The resistance value $R_V$ of the variable resistor 46 may be reduced when the drive motor 10 and the sensor gear 42 are driven to rotate in the forward direction, and be increased when the drive motor 10 and the sensor gear 42 are driven to rotate in the reverse direction. The variable resistor 46 may have a maximum resistance value when the locking member 30 is disposed in the unlocking position $S_1$, and have a minimum resistance value when the locking member 30 is disposed in the locking position $S_2$.

As illustrated in FIG. 3, the base resistor 44 and the variable resistor 46 may be connected in series. As shown in Equations 2 and 3, a predetermined output voltage $V_T$ may be distributed according to a ratio of the resistance value $R_B$ of the base resistor 44 and the resistance value $R_V$ of the variable resistor 46 and be then applied to the base resistor 44 and the variable resistor 46.

$$V_B = \frac{R_B}{R_B + R_V} * V_T \qquad \text{Equation 2}$$

$$V_R = \frac{R_V}{R_B + R_V} * V_T \qquad \text{Equation 3}$$

$R_B$: base resistance
$R_V$: variable resistance
$V_T$: output voltage
$V_B$: voltage value of base resistor
$V_R$: voltage value of variable resistor According to Equation 3, the voltage value $V_R$ of the variable resistor 46 may be varied to correspond to the variable resistance value $R_V$ of the variable resistor 46. In other words, the voltage value $V_R$ of the variable resistor 46 may be varied to correspond to the current position of the locking member 30 on the movement path. That is, the voltage value $V_R$ of the variable resistor 46 may be reduced when the drive motor 10 is driven to rotate in the forward direction such that the locking member 30 is moved to the locking position $S_2$, and may be increased when the drive motor 10 is driven to rotate in the reverse direction such that the locking member 30 is moved to the unlocking position $S_1$. Thus, as illustrated in FIG. 4, the voltage value $V_R$ of the variable resistor 46 may correspond to a maximum voltage value when the locking member 30 is disposed in the unlocking position $S_1$, and may correspond to a minimum voltage value when the locking member 30 is disposed in the locking position $S_2$. The controller 50 may determine the operating states of the locking member 30, such as the current position of the locking member 30 on the movement path, the movement direction of the locking member 30, the movement velocity of the locking member 30, and the locking or unlocking of the object 60, on the basis of the voltage value $V_R$ of the variable resistor 46.

Hereinafter, the voltage value $V_R$ of the variable resistor 46 when the locking member 30 is disposed in the unlocking position $S_1$ will be referred to as a first voltage value $V_1$, and the voltage value $V_R$ of the variable resistor 46 when the locking member 30 is disposed in the locking position $S_2$ will be referred to as a second voltage value $V_2$.

The controller 50 may include a microprocessor or central processing unit, a read only memory (ROM), a random access memory (RAM), an electrically programmable read only memory (EPROM), and a high speed clock.

Figure 5:
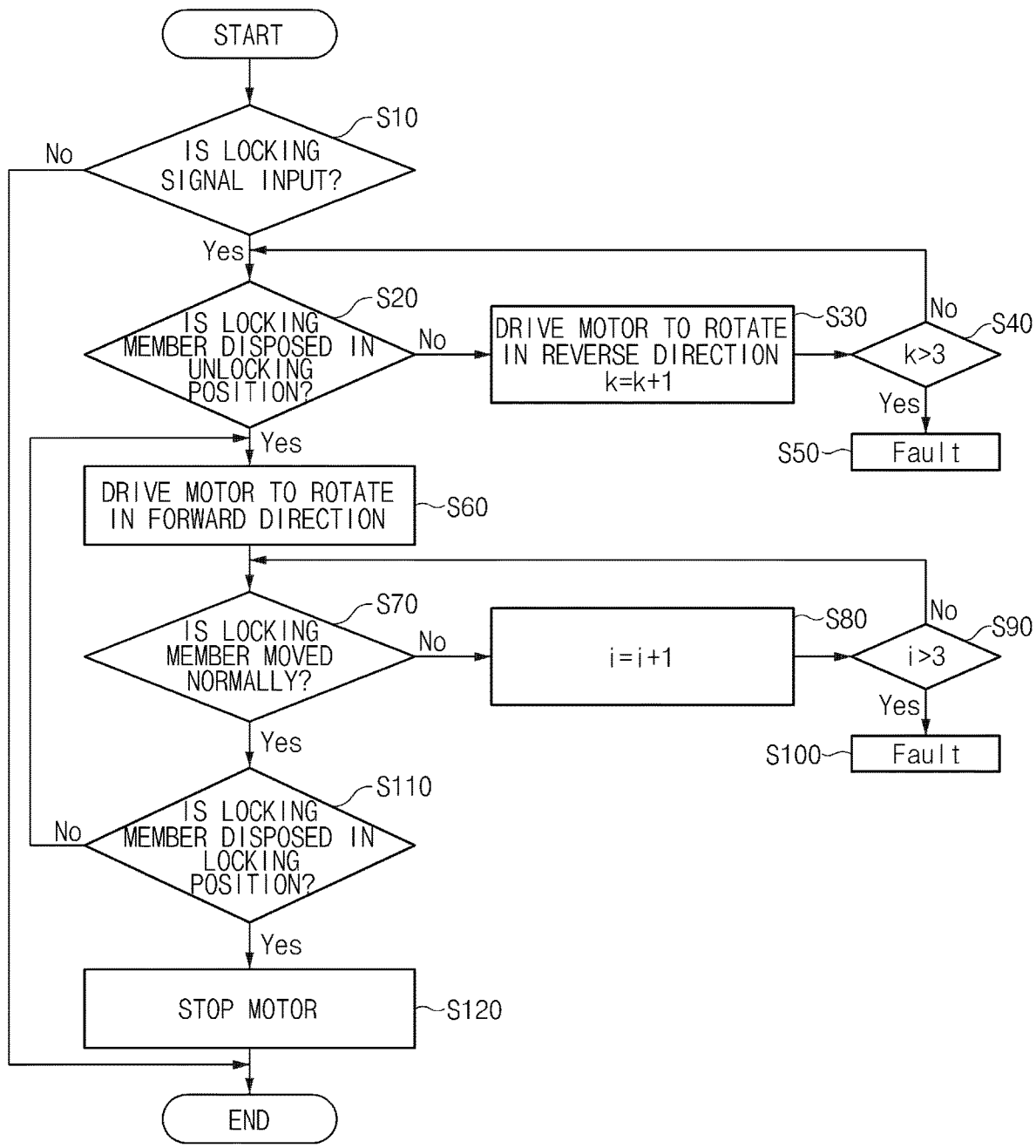
FIG. 5 is a flowchart of a method for locking an object by the locking member using the locking mechanism illustrated in FIG. 1.

FIG. 5 is a flowchart of a method for locking an object by the locking member using the locking mechanism illustrated in FIG. 1.

Hereinafter, a method for locking the object 60 to be locked using the locking mechanism 1 will be described.

The controller 50 may determine whether or not a locking signal for locking the object 60 is input in operation S10. The locking signal is not particularly limited. For example, the locking signal may be a signal indicating that the locking mechanism 1 is mounted in a predetermined position on an apparatus to which the locking mechanism 1 is applied. In other words, the locking signal may be a signal indicating that when the locking mechanism 1 is applied to an electric vehicle, a charger plug is connected to a predetermined position of a charging inlet.

When it is determined that the locking signal is input, the controller 50 may determine whether or not the locking member 30 is disposed in the unlocking position $S_1$ in operation S20. A method for configured to determine whether or not the locking member 30 is disposed in the unlocking position $S_1$ is not particularly limited. For example, the controller 50 may determine whether or not the locking member 30 is disposed in the unlocking position $S_1$ on the basis of whether or not the voltage value $V_R$ of the variable resistor 46 is the first voltage value $V_1$. When the voltage value $V_R$ of the variable resistor 46 is the first voltage value $V_1$, the controller 50 may determine that the locking member 30 is disposed in the unlocking position $S_1$, and when the voltage value $V_R$ of the variable resistor 46 is not the first voltage value $V_1$, the controller 50 may determine that the locking member 30 is not disposed in the unlocking position $S_1$. The first voltage value $V_1$ corresponds to the maximum voltage value of the variable resistor 46. Thus, when the voltage value $V_R$ of the variable resistor 46 is not the first voltage value $V_1$, the locking member 30 may be spaced apart from the unlocking position $S_1$ by a predetermined distance in a direction toward the locking position $S_2$ so that the voltage value $V_R$ of the variable resistor 46 may be lower than the first voltage value $V_1$.

When it is determined that the locking member 30 is not disposed in the unlocking position $S_1$, the controller 50 may drive the drive motor 10 to rotate in a reverse direction in operation S30 such that the locking member 30 may be moved to the unlocking position $S_1$. Here, the controller 50 may drive the drive motor 10 to rotate by a predetermined angle in a stepwise manner, but is not limited thereto. When the voltage value $V_R$ of the variable resistor 46 reaches the first voltage value $V_1$, the controller 50 may determine that the locking member 30 is disposed in the unlocking position $S_1$, and stop the drive motor 10.

Even if the drive motor 10 is driven to rotate in the reverse direction, the locking member 30 may fail to be moved to the unlocking position $S_1$ due to the penetration of foreign materials, the erroneous mounting of the object 60, or any other reasons. Thus, the controller 50 may determine whether or not an abnormality has occurred in the operating state of the locking member 30 on the basis of whether the voltage value $V_R$ of the variable resistor 46 is changed to be close to the first voltage value $V_1$. For example, as illustrated in FIG. 5, when the voltage value $V_R$ of the variable resistor 46 does not reach the first voltage value $V_1$ even though the drive motor 10 is repeatedly driven to rotate in the reverse direction by a predetermined number of times in operation S40, the controller 50 may determine that an abnormality has occurred in the operating state of the locking member 30 in operation S50. When it is determined that an abnormality has occurred in the operating state of the locking member 30 in operation S50, the controller 50 may stop the drive motor 10, and display the occurrence of the abnormality in the operating state of the locking member 30 using an alarm device, a display device, or the like.

When the locking member 30 is disposed in the unlocking position $S_1$ at the time of input of the locking signal, or when the locking member 30 is moved to be disposed in the unlocking position $S_1$ using the drive motor 10 even though the locking member 30 is not disposed in the unlocking position $S_1$ at the time of input of the locking signal, the controller 50 may drive the drive motor 10 to rotate in a forward direction in operation S60 such that the locking member 30 may be moved to the locking position $S_2$. Here, the controller 50 may drive the drive motor 10 to rotate by a predetermined angle in a stepwise manner, but is not limited thereto.

The controller 50 may determine whether or not the locking member 30 is normally moved to the locking position $S_2$ on the basis of variations in the voltage value $V_R$ of the variable resistor 46 in operation S70. For example, the controller 50 may determine whether or not the locking member 30 is normally moved to the locking position $S_2$ on the basis of whether the voltage value $V_R$ of the variable resistor 46 is changed to be close to the second voltage value $V_2$. The second voltage value $V_2$ corresponds to the minimum voltage value of the variable resistor 46. Thus, the controller 50 may determine whether or not the locking member 30 is normally moved to the locking position $S_2$ on the basis of whether the voltage value $V_R$ of the variable resistor 46 is reduced to be close to the second voltage value $V_2$. For example, as illustrated in FIG. 5, when it is determined that the voltage value $V_R$ of the variable resistor 46 is not reduced to be close to the second voltage value $V_2$ even though the drive motor 10 is repeatedly driven to rotate in the forward direction by a predetermined number of times in operations S80 and S90, the controller 50 may determine that an abnormality has occurred in the operating state of the locking member 30 in operation S100. When it is determined that an abnormality has occurred in the operating state of the locking member 30 in operation S100, the controller 50 may stop the drive motor 10, and display the occurrence of the abnormality in the operating state of the locking member 30 using the alarm device, the display device, or the like.

When the voltage value $V_R$ of the variable resistor 46 reaches the second voltage value $V_2$ in operation S110, the controller 50 may determine that the locking member 30 is disposed in the locking position $S_2$ so that the object 60 may be locked, and may stop the drive motor 10 in operation S120.

Figure 6:
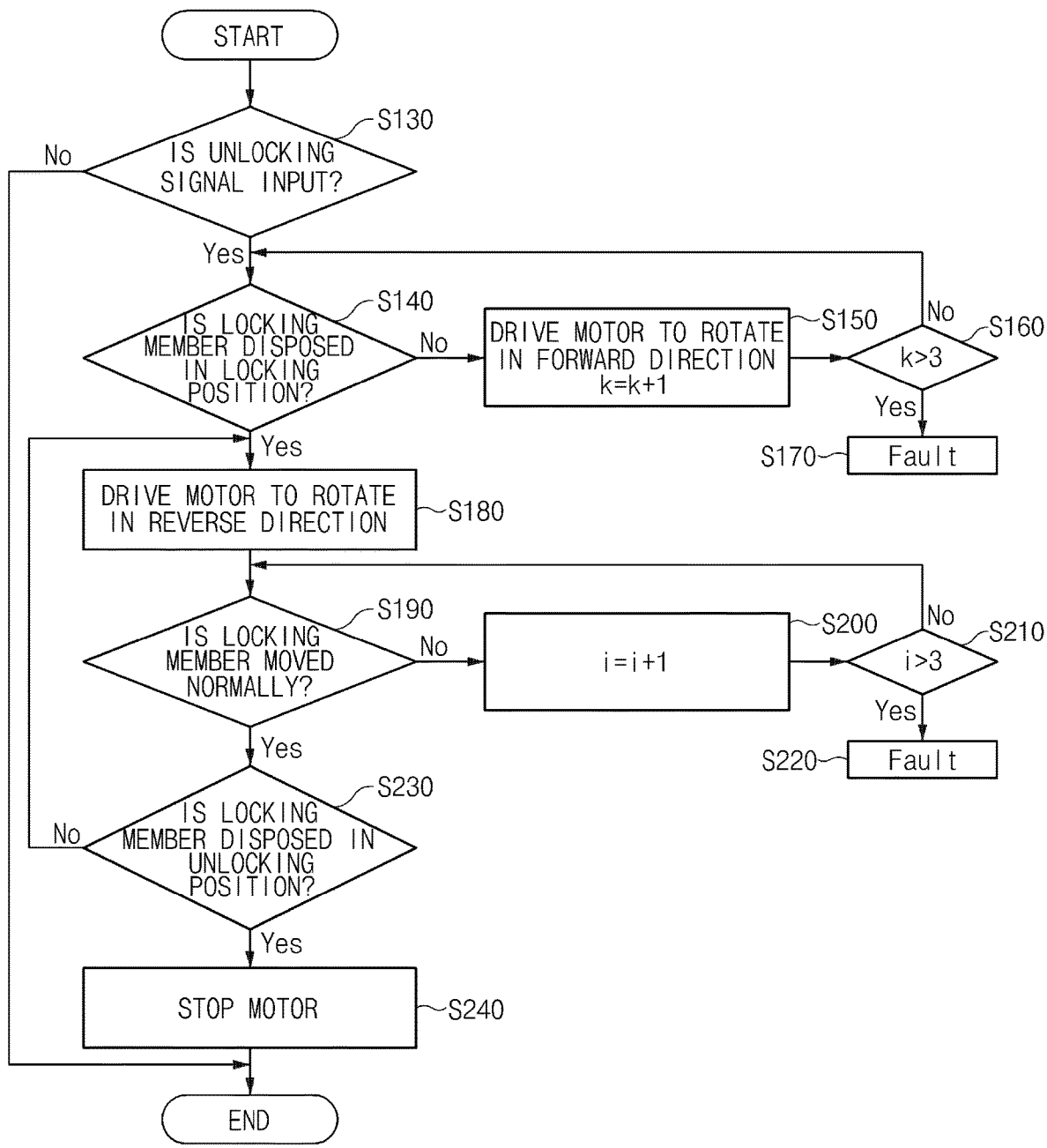
FIG. 6 is a flowchart of a method for unlocking an object by the locking member using the locking mechanism illustrated in FIG. 1.

FIG. 6 is a flowchart of a method for unlocking an object by the locking member using the locking mechanism illustrated in FIG. 1.

Hereinafter, a method for unlocking the object 60 using the locking mechanism 1 will be described.

The controller 50 may determine whether or not an unlocking signal for unlocking the object 60 is input in operation S130. The unlocking signal is not particularly limited. For example, the unlocking signal may be a signal indicating that charging of a battery has been completed.

When it is determined that the unlocking signal is input, the controller 50 may determine whether or not the locking member 30 is disposed in the locking position $S_2$ in operation S140. A method for configured to determine whether or not the locking member 30 is disposed in the locking position $S_2$ is not particularly limited. For example, the controller 50 may determine whether or not the locking member 30 is disposed in the locking position $S_2$ on the basis of whether or not the voltage value $V_R$ of the variable resistor 46 is the second voltage value $V_2$. When the voltage value $V_R$ of the variable resistor 46 is the second voltage value $V_2$, the controller 50 may determine that the locking member 30 is disposed in the locking position $S_2$, and when the voltage value $V_R$ of the variable resistor 46 is not the second voltage value $V_2$, the controller 50 may determine that the locking member 30 is not disposed in the locking position $S_2$. The second voltage value $V_2$ corresponds to the minimum voltage value of the variable resistor 46. Thus, when the voltage value $V_R$ of the variable resistor 46 is not the second voltage value $V_2$, the locking member 30 may be spaced apart from the locking position $S_2$ by a predetermined distance in a direction toward the unlocking position $S_1$ so that the voltage value $V_R$ of the variable resistor 46 may be higher than the second voltage value $V_2$.

When it is determined that the locking member 30 is not disposed in the locking position $S_2$, the controller 50 may drive the drive motor 10 to rotate in a forward direction in operation S150 such that the locking member 30 may be moved to the locking position $S_2$. Here, the controller 50 may drive the drive motor 10 to rotate by a predetermined angle in a stepwise manner, but is not limited thereto. When the voltage value $V_R$ of the variable resistor 46 reaches the second voltage value $V_2$, the controller 50 may determine that the locking member 30 is disposed in the locking position $S_2$, and stop the drive motor 10.

Even if the drive motor 10 is driven to rotate in the forward direction, the locking member 30 may fail to be moved to the locking position $S_2$ due to the penetration of foreign materials, the erroneous mounting of the object 60, or any other reasons. Thus, the controller 50 may determine whether or not an abnormality has occurred in the operating state of the locking member 30 on the basis of whether the voltage value $V_R$ of the variable resistor 46 is changed to be close to the second voltage value $V_2$. For example, as illustrated in FIG. 6, when the voltage value $V_R$ of the variable resistor 46 does not reach the second voltage value $V_2$ even though the drive motor 10 is repeatedly driven to rotate in the forward direction by a predetermined number of times in operation S160, the controller 50 may determine that an abnormality has occurred in the operating state of the locking member 30 in operation S170. When it is determined that an abnormality has occurred in the operating state of the locking member 30 in operation S170, the controller 50 may stop the drive motor 10, and display the occurrence of the abnormality in the operating state of the locking member 30 using an alarm device, a display device, or the like.

When the locking member 30 is disposed in the locking position $S_2$ at the time of input of the unlocking signal, or when the locking member 30 is moved to be disposed in the locking position $S_2$ using the drive motor 10 even though the locking member 30 is not disposed in the locking position $S_2$ at the time of input of the unlocking signal, the controller 50 may drive the drive motor 10 to rotate in a reverse direction in operation S180 such that the locking member 30 may be moved to the unlocking position $S_1$. Here, the controller 50 may drive the drive motor 10 to rotate by a predetermined angle in a stepwise manner, but is not limited thereto.

The controller 50 may determine whether or not the locking member 30 is normally moved to the unlocking position $S_1$ on the basis of variations in the voltage value $V_R$ of the variable resistor 46 in operation S190. For example, the controller 50 may determine whether or not the locking member 30 is normally moved to the unlocking position $S_1$ on the basis of whether the voltage value $V_R$ of the variable resistor 46 is changed to be close to the first voltage value $V_1$. The first voltage value $V_1$ corresponds to the maximum voltage value of the variable resistor 46. Thus, the controller 50 may determine whether or not the locking member 30 is normally moved to the unlocking position $S_1$ on the basis of whether the voltage value $V_R$ of the variable resistor 46 is increased to be close to the first voltage value $V_1$. For example, as illustrated in FIG. 6, when it is determined that the voltage value $V_R$ of the variable resistor 46 is not increased to be close to the first voltage value $V_1$ even though the drive motor 10 is repeatedly driven to rotate in the reverse direction by a predetermined number of times in operations S200 and S210, the controller 50 may determine that an abnormality has occurred in the operating state of the locking member 30 in operation S220. When it is determined that an abnormality has occurred in the operating state of the locking member 30 in operation S220, the controller 50 may stop the drive motor 10, and display the occurrence of the abnormality in the operating state of the locking member 30 using the alarm device, the display device, or the like.

When the voltage value $V_R$ of the variable resistor 46 reaches the first voltage value $V_1$ in operation S230, the controller 50 may determine that the locking member 30 is disposed in the unlocking position $S_1$ so that the object 60 may be unlocked, and may stop the drive motor 10 in operation S240.

As described above, the locking mechanism 1 may detect the operating state of the locking member 30 on the basis of the voltage value $V_R$ of the variable resistor 46 provided in the position sensor 40. Thus, the locking mechanism 1 may be prevented from being continuously driven in a state in which an abnormality has occurred in the operating state of the locking member 30, thereby avoiding overload and preventing electrical or mechanical damage to the locking mechanism 1. In addition, the object 60 may be a charger plug connected to a charging inlet of an electric vehicle, and in this case, the locking mechanism 1 may prevent its operation from proceeding if the charger plug is erroneously connected to the charging inlet, thereby preventing charging failure of a battery.

Meanwhile, as described above, the stroke moving distance L of the locking member 30 may be set differently according to the specifications of an apparatus to which the locking member 30 is applied or the specifications of the object 60 to be locked. On the other hand, regardless of the stroke moving distance L of the locking member 30, the locking mechanism 1 may determine the locking or unlocking of the object 60 using the voltage value $V_R$ of the variable resistor 46 provided in the position sensor 40. Thus, the locking mechanism 1 may be applicable to a variety of apparatuses without structural modifications.

As set forth above, the locking mechanism according to exemplary embodiments of the present disclosure may detect the operating state of the locking member on the basis of the voltage value of the variable resistor provided in the position sensor, thereby preventing electrical or mechanical damage due to overload, and preventing its operation using an object to be locked from proceeding if the object is erroneously mounted.

In addition, the locking mechanism according to exemplary embodiments of the present disclosure may determine the locking or unlocking of the object using the resistance value of the variable resistor, regardless of the stroke moving distance of the locking member, and thus it may be applicable to a variety of apparatuses without structural modifications.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A locking mechanism, comprising:
   a drive motor;
   a locking member configured to perform a linear reciprocating motion along a predetermined movement path by the drive motor, and selectively locking or unlocking a predetermined object to be locked according to a position of the locking member on the movement path;
   a position sensor including a sensor gear rotatably driven by the drive motor and a variable resistor having a variable resistance value that varies in response to a rotation angle of the sensor gear; and
   a controller configured to determine an operating state of the locking member on the basis of a voltage value applied to the variable resistor,
   wherein the locking member is configured to be moved between an unlocking position in which the locking member is separated from a locking groove of the object and a locking position in which a predetermined portion of the locking member is engaged with the locking groove of the object by the drive motor, and
   wherein when the locking member is moved to a predetermined unlocking position, the voltage value of the variable resistor is changed to a predetermined first voltage value, and when the locking member is moved to a predetermined locking position, the voltage value of the variable resistor is changed to a predetermined second voltage value.

2. The locking mechanism according to claim 1, wherein the position sensor further includes a base resistor having a predetermined fixed resistance value.

3. The locking mechanism according to claim 1, further comprising a transfer gear mission configured to transmit a rotational force of the drive motor to each of the locking member and the sensor gear.

4. The locking mechanism according to claim 3, wherein the transfer gear mission comprises a pinion gear, and the locking member includes a rack gear meshing with the pinion gear.

5. The locking mechanism according to claim 3, wherein the drive motor includes a shaft gear configured to output the rotational force, and the transfer gear includes a first reduction gear meshing with the shaft gear and the sensor gear to transmit the rotational force to the sensor gear.

6. The locking mechanism according to claim 5, wherein the transfer gear includes a second reduction gear connected with the first reduction gear and the locking member.

7. The locking mechanism according to claim 1, wherein the controller drives the drive motor to move the locking member to the locking position when a locking signal is input, and drives the drive motor to move the locking member to the unlocking position when an unlocking signal is input.

8. The locking mechanism according to claim 7, wherein the controller drives the drive motor to rotate in a forward direction so as to move the locking member to the locking position when the voltage value is the first voltage value at the time of input of the locking signal.

9. The locking mechanism according to claim 8, wherein the controller stops the drive motor when the voltage value is changed to the second voltage value, while driving the drive motor to rotate in the forward direction so as to move the locking member to the locking position.

10. The locking mechanism according to claim 8, wherein the controller determines that an abnormality has occurred in the operating state of the locking member when the voltage value is not changed to be close to the second voltage value, while driving the drive motor to rotate in the forward direction so as to move the locking member to the locking position.

11. The locking mechanism according to claim 8, wherein the controller drives the drive motor to rotate in a reverse direction so as to move the locking member to the unlocking position when the voltage value is not the first voltage value at the time of input of the locking signal, and changes the voltage value to the first voltage value.

12. The locking mechanism according to claim 11, wherein the controller determines that an abnormality has occurred in the operating state of the locking member when the voltage value is not changed to be close to the first voltage value, while driving the drive motor to rotate in the reverse direction so as to move the locking member to the unlocking position.

13. The locking mechanism according to claim 7, wherein the controller drives the drive motor to rotate in a reverse direction so as to move the locking member to the unlocking position when the voltage value is the second voltage value at the time of input of the unlocking signal.

14. The locking mechanism according to claim 13, wherein the controller stops the drive motor when the voltage value is changed to the first voltage value, while driving the drive motor to rotate in the reverse direction so as to move the locking member to the unlocking position.

15. The locking mechanism according to claim 13, wherein the controller determines that an abnormality has occurred in the operating state of the locking member when the voltage value is not changed to be close to the first voltage value, while driving the drive motor to rotate in the reverse direction so as to move the locking member to the unlocking position.

16. The locking mechanism according to claim 13, wherein the controller drives the drive motor to rotate in a forward direction so as to move the locking member to the locking position when the voltage value is not the second voltage value at the time of input of the unlocking signal, and changes the voltage value to the second voltage value.

17. The locking mechanism according to claim 16, wherein the controller determines that an abnormality has occurred in the operating state of the locking member when the voltage value is not changed to be close to the second voltage value, while driving the drive motor to rotate in the forward direction so as to move the locking member to the locking position.

* * * * *